June 20, 1950 R. G. CLAPP 2,512,305

ELECTRICAL SYSTEM

Filed Dec. 15, 1945 2 Sheets-Sheet 1

INVENTOR.
RICHARD G. CLAPP

BY
Ostrolenk + Faber

ATTORNEYS

June 20, 1950 R. G. CLAPP 2,512,305

ELECTRICAL SYSTEM

Filed Dec. 15, 1945 2 Sheets-Sheet 2

INVENTOR.
RICHARD G. CLAPP
BY Ostrolenk & Faber
ATTORNEYS

Patented June 20, 1950 2,512,305

UNITED STATES PATENT OFFICE 2,512,305

ELECTRICAL SYSTEM

Richard G. Clapp, Haverford, Pa., assignor, by mesne assignments, to Philco Corporation, Philadelphia, Pa., a corporation of Pennsylvania Application December 15, 1945, Serial No. 635,326

22 Claims. (Cl. 315—27)

This invention relates to cathode ray tube systems, and more particularly it relates to a deflection system for television picture tubes.

It is common with television picture tubes and in particular in the circuits associated with such tubes to use magnetic deflecting coils for sweeping the electron beam of the cathode ray tube across the face of the tube in a predetermined manner.

In carrying out this sweeping operation, the current in a pair of coils is caused to increase linearly with time, thus creating a magnetic field which increases linearly with time. As this magnetic field increases, the electron beam within the cathode ray tube is deflected more and more to one side of the tube.

When the deflection has reached a sufficiently great amplitude, the electronic circuit supplying the magnetic coil automatically and quickly reverses the current in the coil so as to restore the cathode ray beam to the original side of the cathode ray tube. The magnetic field is then again changed linearly with time, so that the cathode ray beam again sweeps across the face of the tube to the opposite side.

The basic design for electronic circuits for this purpose has been covered in text-books, as for example, in "Ultra High Frequency Technique" by Brainard, Koehler, Reich and Woodruff, pages 218 and 219.

Inasmuch as the time consumed in returning the beam to its original position is not useful for picture transmission, it becomes desirable, with the type of sweep circuit here mentioned, to obtain a very rapid return of the electron beam from the terminating end of the sweep to the other end or the beginning of the sweep.

It is an object of this invention to provide a means for decreasing this retrace time, or the time required to start a new sweep once a preceding sweep is finished.

In elementary sweep circuits of the kind which I have made reference to, the sweep current is caused by the application of a substantially constant voltage across the inductor of the sweeping or deflecting coil. The retrace is caused by the application of a considerably higher voltage of opposite polarity across the inductor of the deflecting coil.

In my invention I provide means for increasing this high voltage of opposite polarity, and thereby I achieve a faster retrace time than has been obtained in the prior art. This extra voltage I generate in a blocking oscillator, which is coupled to the circuit normally used for supplying the sweep current. This blocking oscillator provides extra voltage at exactly the right time to increase the retrace speed.

Thus it is a further object of my invention to shorten the retrace time in a cathode ray oscillograph.

Another object of my invention is to provide means for applying a blocking oscillator to a common magnetically deflected cathode ray sweep circuit in order to achieve a more rapid retrace time.

These and other objects of my invention will become evident upon a consideration of the drawings in which Figure 1 represents a schematic diagram of my circuit.

Figure 1:
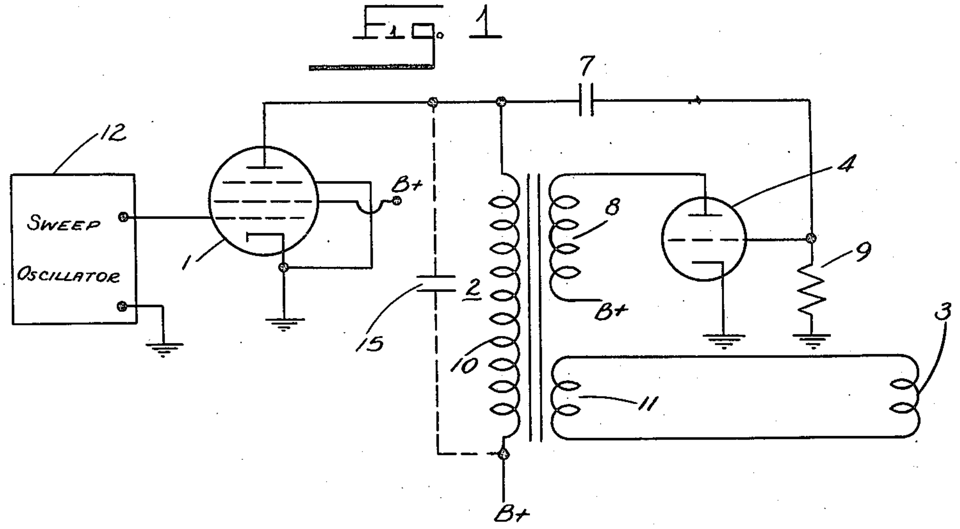
Figure 3:
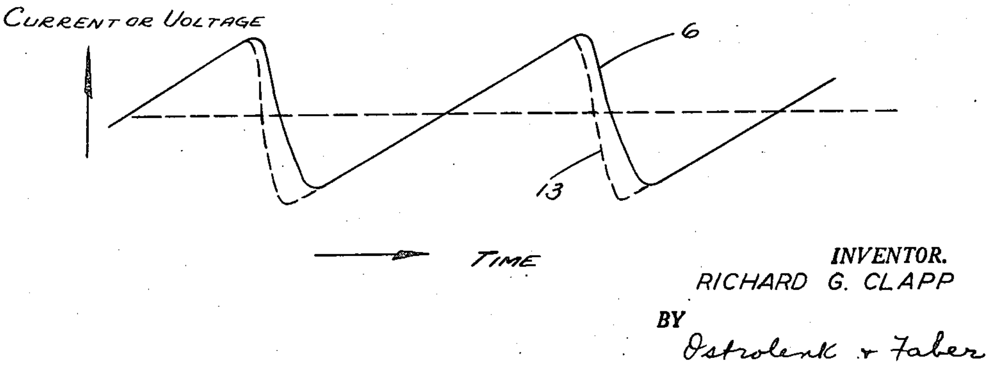
Figure 3 represents the current in another part of my circuit.

Referring now to Figure 1, it is desired that a saw-tooth current flow in coil 3 which symbolically represents the deflecting coil of the cathode ray oscillograph. The wave shape of the current which is desired in this coil is shown in Figure 3. Coil 3 is connected to winding 11 of a transformer 2. This transformer 2 has another winding 10. Winding 10 is connected between the B-plus supply and the anode of vacuum tube 1.

Vacuum tube 1 may be an ordinary pentode tube with its suppressor connected to the cathode and with its screen connected to B-plus. The control grid of tube 1 is fed by a sweep oscillator 12. This sweep oscillator 12 generates a voltage of substantially the same wave shape as the dashed line current wave shown in Figure 3, and marked 13.

The part of the circuit which has been described above is the common magnetic sweep circuit employed in television at the present time.

The circuit, which I have added to this common circuit, comprises the winding 8 on the transformer 2, which is fed by tube 4, which in turn is fed on its grid from the anode of tube 1 by coupling capacitor 7 and resistor 9. Tube 4 with its associated circuit acts essentially as a blocking oscillator in a manner which will now be described.

The grid voltage supplied to tube 1 by sweep oscillator 12 goes strongly negative during retrace in order to block the tube. Since tube 1 is a pentode, its plate current should be substantially independent of the impedance in the plate circuit and practically identical in wave shape to the voltage impressed on its grid. The coupling between coils 10 and 11 of transformer 2 is very tight so that the wave shape of the current in coil 11 and deflection coil 3 is practically identical with that of the current in coil 10. Curve 13 in Figure 3 represents the plate current of tube 1 and the current in deflection coil 3.

In practice, however, the wave shape of the plate current of tube 1 and the current in deflection coil 3 is of the form shown by curve 6 in Figure 3. This is due primarily to the action of the distributed capacity of winding 10, which is represented in Figure 1 by condenser 15. The current decreases more slowly than it should, while the plate voltage of tube 1 rises to a moderately high value, as shown by curve 5 in Figure 2. This voltage value is proportional to the rate of decrease of the current.

In accordance with my invention, I augment the moderately high voltage applied to coil 3 during the time when the current is decreasing in coil 10 by a pulse of voltage supplied to the circuit through coil 8, and the transformer action of transformer 2. Thus, at the instant when the plate of tube 1 goes positive, the grid of tube 4 also goes positive through the action of capacitor 7 and resistor 9.

This action is cumulative since once the current starts to flow in tube 4, the plate of tube 1 is driven more and more positive because of the poling of the transformer coils 8 and 10. This cumulative action drives the voltage on the plate of tube 1 to a higher level than it would reach in the absence of blocking oscillator tube 4.

Since this voltage is higher, a higher rate of change of current occurs in coils 10 and 3. The result of this is that the current in coil 3 will be reduced to its minimum value in a shorter time than previously. This is shown in Figure 3 by the dotted curve 13.

When the plate current of tube 4 reaches saturation, the positive voltage on the grid of tube 4 is no longer induced by the action of windings 10 and 8. The grid of tube 4 then begins to drop in voltage. The time required for this to happen is largely a matter of the design of transformer 2. As soon as this happens, the current in coil 8 begins to drop, which induces a negative component of voltage on the plate of tube 1, which by the action of capacitor 7, further drops the voltage on the grid of tube 4. This again has a cumulative effect so that tube 4 rapidly turns itself off, cutting off plate current flow in tube 4. Tube 4 then becomes quiescent.

The time constant of the grid circuit of tube 4 provided by condenser 7 and resistor 9 is chosen to be longer than the period of the wave impressed by sweep oscillator 12. Consequently when tube 4 is restored to the quiescent condition, with its grid negative, it will remain in this condiiton until the next time that tube 1 is cut off.

Figure 2:
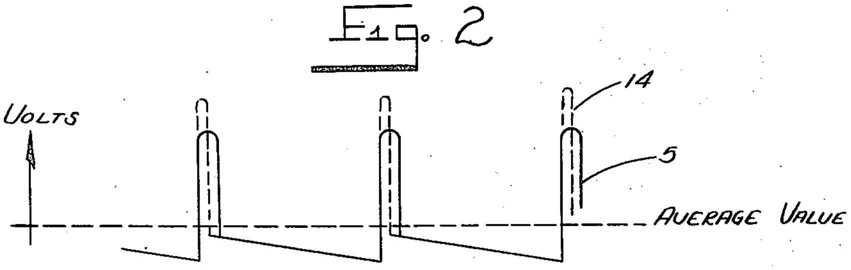
Figure 2 represents the voltage in one part of my circuit.

As soon as sweep oscillator 12 allows tube 1 to commence to conduct again, a current which increases linearly with time commences to flow in coils 10 and 3, and the voltage on the plate of tube 1 is restored to a value slightly more negative than its average, as shown in Figure 2.

At 14 in Figure 2 I have shown that the voltage at the plate of tube 1 rises to an increased height as a result of the application of the blocking oscillator circuit to the customary sweep circuit.

At 13 in Figure 3 I have shown that the retrace time of the current for the sweep circuit is materially reduced by this action.

In order that the circuits described above may be more clearly understood, a breakdown analysis of the relative voltages and currents occurring at various periods of the cycle of operation is given in the following:

*Analysis of output wave of the sweep generator*

For the purpose of this discussion, in the curves of Figures 4, 5, 6, 7 and 8, I use $E_{so}$ as the output of the sweep oscillator 12.

$E_{pl}$ is the alternating component of voltage on plate of tube 1.

$i_2$ is the alternating component of the current in transformer 2.

$i_3$ is the current flowing in coil 3.

Figure 4:
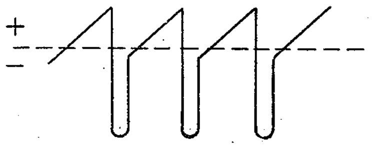
Figure 4 is a voltage curve of the sweep oscillator.

During the period $t_1$ from points $a$ to $b$ in Figure 4, the voltage $E_{so}$ slowly rises linearly from the value at $a$ to the value at $b$.

In the first approximation, the effects of tube 4 will be ignored.

Figure 5:
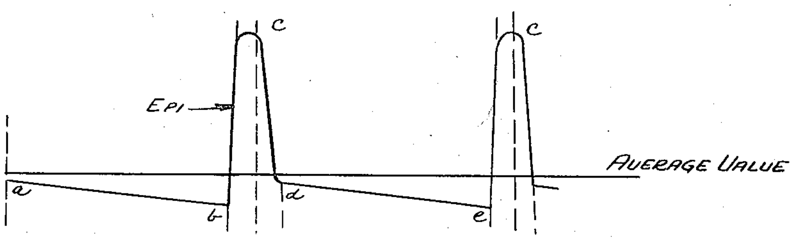
Figure 5 is a plate voltage curve for explaining my invention.

The voltage $E_{so}$ is applied to the grid of tube 1 as shown in Figure 1. This results in an alternating component of voltage developed at the plate of tube 1 and across the winding 10. This voltage $E_{pl}$ is shown in Figure 5.

This voltage induces a voltage through the transformer action of transformer 2, in secondary 11. This voltage curve is similar to $E_{pl}$ and is substantially the curve shown in Figure 5. During the period from $a$ to $b$, this represents a practically constant voltage applied to coil 3.

Figure 6:
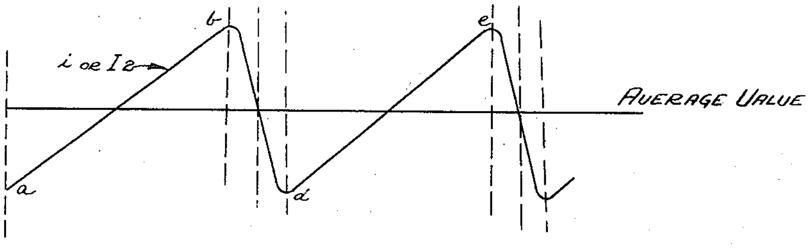
Figure 6 is the current curve in the deflecting winding.

When a constant voltage is suddently applied to an inductor with resistance in series, the current builds up slowly in an exponential manner. That is, there is no instantaneous change in current. Furthermore, if the applied voltage increases slowly during the build-up period, the current can be made more nearly linear with respect to time than truly logarithmic. This is shown in Figure 6 as the current builds up from $a$, which is assumed negative at the start, to $b$, corresponding to the voltage $E_{so}$ from $a$ to $b$ in Figure 4.

During the time from $b$ to $c$ in Figure 4, the voltage $E_{so}$ rapidly drops negatively to its original value, and the plate current of tube 1 drops in the same time to zero. The current existing in coil 10 at this time cannot decrease instantly to zero without inducing an infinite voltage across coil 10, which, of course, never occurs in nature. The current $i_2$ is related to the voltage across the coil, $E_{pl}$, by the equations:

$$E_{pl}=-L\frac{di_2}{dt}$$

and after the tube is cut off, $$E_{pl}=\frac{1}{C}i_2dt$$

where $i_2$=the current in coil 10, C=the capacity of condenser 15, and L=the effective inductance of coil 10. The resistance of coil 10 is neglected. It can be seen from these equations that if the plate current of the tube is suddenly cut off, the voltage $E_{p1}$ and the current $i_2$ will go through a sinusoidal oscillation in which $E_{p1}$ starts from its lowest value, rises to a high value and goes back to a low value (point *d* in Figure 5), while $i_2$ starts from its maximum positive value and decreases in the same time to its maximum negative value. (Point *d* in Figure 6.) It should be noted that the time required to reach point *d* is not necessarily the same as the time required for $E_{s0}$ to go from *b* to *c*, but is usually longer, being controlled only by L and C. Consequently before the current $i_2$ has reached its maximum negative excursion, tube 1 has started to conduct again. In practice, the sinusoidal oscillation of $i_2$ (and $E_{p1}$) is damped by the losses in transformer 2 and by other means, so that after going through a half cycle, the oscillation stops and the original condition of a slowly rising current, shown by the section from *d* to *e* in Figure 6, is restored.

It is now clear that a voltage wave of the type shown in Figure 5 will produce a current wave of the type shown in Figure 6 in a coil. Hence, in order to show how the retrace time, represented by the portion *b*—*d* of Figure 6, can be reduced, it will be sufficient to show that the magnitude of the voltage at *c* in Figure 5 is increased.

Considering now the blocking oscillator during the period *a* to *b*, the voltage due to the sweep oscillator 12 appears in the plate circuit of tube 1 as the portion from *a* to *b* of Figure 5. This negative voltage is applied through capacitor 7 and resistor 9 to the grid of 4. This voltage cuts off tube 4, and hence does not appear in its output. Thus this portion of the cycle is not affected by tube 4.

Immediately following point *b* in Figure 5 the plate voltage of tube 1, $E_{p1}$ commences to rise rapidly. This same rising voltage appears also on the grid of tube 4. Since tube 4 is connected as a blocking oscillator, the impedance it presents to transformer 2 is a negative resistance. This negative resistance causes the damping on the sinusoidal oscillation of $E_{p1}$ and the current $i_2$ in coil 10 to become negative, and the amplitude of the oscillation to be greatly increased. However, after the combined circuit has passed through one half cycle of oscillation, the oscillation is damped out for two reasons: first, the external damping means frequently employed in television sweep circuits and not shown here, and second, the blocking oscillator, after producing a pulse, leaves its grid charged very negatively, thus preventing the tube from undergoing further oscillations until the charge on the grid has leaked off or a new pulse triggers it again.

The time required for the combined circuit to pass through one half cycle of oscillation is now determined primarily not by the inductance of coil 2 and the capacitance of capacitor 15, but by the level at which tube 4 and transformer 2 overload, which determines when voltage $E_{p1}$ ceases to rise and commences to drop again. This time can be made much shorter than it is in ordinary television sweep circuits.

Figure 7:
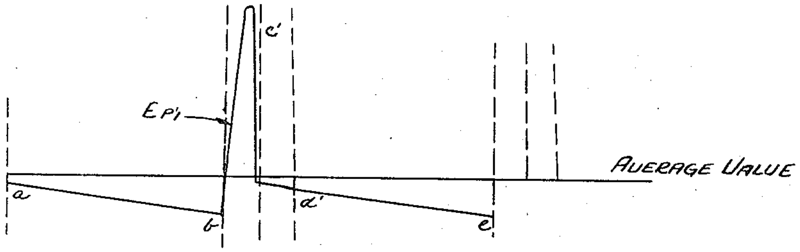
Figure 7 is the grid voltage curve applied to the novel circuit of my invention.
Figure 8:
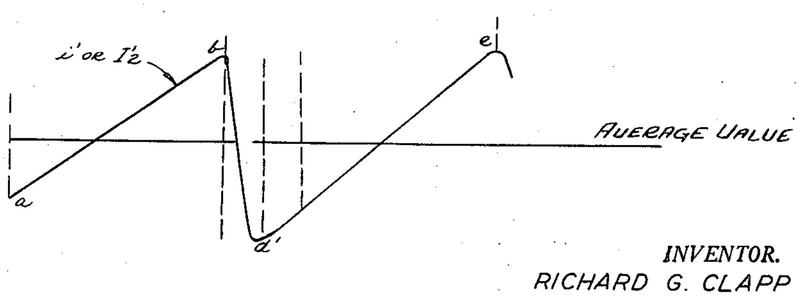
Figure 8 is a representation of the resultant deflecting currents in the deflecting coils.

Figure 7 shows the variation of $E_{p1}$ when the blocking oscillator is operating. Points *a*, *b* and *c* are the same as in Figure 5. Point *c'* represents the time at which $E_{p1}$ ceases to rise and commences to fall due to the action of the blocking oscillator and point *d'* that time at which the original condition is again restored and which is earlier than point *c* in Figure 4. Standard external damping means common in these circuits used in television systems will prevent the voltage going more negative than that attained at point *d'*.

The reducing of the retrace time of the cathode ray beam in the television tube is a decided advantage, in that it reduces the percentage of transmission time taken up by the signal retrace.

I have described my invention above with respect to a specific circuit, but in the spirit of my invention I prefer to have it described by the following claims.

I claim:

1. In a circuit arrangement for decreasing the retrace time of an electron beam of a cathode ray tube a deflecting coil, circuit means for applying a voltage of one polarity to said deflecting coil for deflecting said electron beam and for applying to said deflecting coil a relatively high voltage of opposite polarity to said one polarity for effecting a retrace of said electron beam and means including a power tube, a transformer having a secondary and a primary, said primary being connected to said power tube and a blocking oscillator comprising a second tube having its input connected to said first tube and having its output coupled to the output of said first tube through the secondary of said transformer, the relation of the winding of the secondary to the primary being such as to accumulatively increase the voltage across said transformer induced by said first tube.

2. An electronic circuit comprising an oscillator, a first electron tube having its input connected to said oscillator; an output circuit including a transformer having a primary and a secondary, the primary being connected to said electron tube; an oscillator including a second electron tube having an input circuit coupled to said output circuit, a second output circuit for said second tube coupled to said output circuit through the secondary of said transformer, the polarity of said coupling being such that when current starts to flow in the output of said second mentioned electron tube, the action becomes accumulative to drive the voltage in the output of said first electron tube to a higher value than it would obtain without said second electron tube.

3. An electronic circuit comprising an oscillator for generating a saw tooth voltage wave shape an electron tube having its input connected to said oscillator and having an output circuit in which the current flowing is substantially of the same wave shape as the wave shape of the voltage impressed in the input of said electronic tube, a transformer connected in said output circuit, the primary and secondary of said transformer being closely coupled to produce a current wave shape in the secondary of said transformer substantially identical with the current wave shape in the primary circuit, the wave shape being such that when the current in the primary is decreasing, a relatively high voltage is induced in said secondary and means including a blocking oscillator for augmenting said induced high voltage during the period of the cycle when the current in the primary is decreasing.

4. An electronic circuit comprising an oscillator for generating a saw tooth voltage wave shape an electron tube having its input connected to said oscillator and having an output circuit in which the current flowing is substantially of the same wave shape as the wave shape of the voltage impressed in the input of said electronic tube, a transformer connected in said output circuit, the primary and secondary of said transformer being closely coupled to produce a current wave shape in the secondary of said transformer substantially identical with the current wave shape in the primary circuit, the wave shape being such that when the current in the primary is decreasing, a relatively high voltage is induced in said secondary and circuit connections to said primary for augmenting said induced high voltage during the period of the cycle when the current in the primary is decreasing.

5. An electronic circuit comprising an oscillator for generating a saw tooth voltage wave shape an electron tube having its input connected to said oscillator and having an output circuit in which the current flowing is substantially of the same wave shape as the wave shape of the voltage impressed in the input of said electronic tube, a transformer connected in said output circuit, the primary and secondary of said transformer being closely coupled to produce a current wave shape in the secondary of said transformer substantially identical with the current wave shape in the primary circuit, the wave shape being such that when the current in the primary is decreasing, a relatively high voltage is induced in said secondary and a blocking osciliator circuit including a second electron tube having its input coupled to the output of said first mentioned electron tube and having its output coupled to said transformer in such a manner that when current begins to flow in the plate of said first electron tube, the cumulative action drives the voltage on the plate of said first electron tube to a higher level than it would reach in the absence of said last mentioned circuit connections.

6. An electronic circuit comprising an oscillator for generating a saw tooth voltage wave shape, an electron tube having its input connected to said oscillator and having an output circuit in which the current flowing is substantially of the same wave shape as the wave shape of the voltage impressed in the input of said electron tube, and a blocking oscillator including a second tube having its input and output coupled to the output circuit of said first mentioned electron tube for increasing the output voltage thereof during the retrace portion of the sawtooth voltage wave.

7. An electronic circuit comprising an oscillator, a first electronic tube having its input connected to said oscillator, an output circuit including a load connected to said electron tube, a blocking oscillator including a second electron tube having its input capacitatively coupled to the output of said first electron tube and having its output coupled to said load, the time constant of the input circuit of said second electron tube being longer than the period of the wave shape impressed in said first tube by said oscillator.

8. An electronic circuit comprising an oscillator, a first electronic tube having its input connected to said oscillator, an output circuit including a load connected to said electron tube, a blocking oscillator including a second electron tube having its input circuit coupled to the output of said first electron tube and having its output coupled to said load, means including circuit connections from said second electron tube to said first tube for affecting the output voltage of said first electron tube, the time constant of the input circuit of said second electron tube being longer than the period of the wave shape impressed in said first tube by said oscillator.

9. An electronic circuit comprising an oscillator, a first electronic tube having its input connected to said oscillator, an output circuit including a load connected to said electron tube, a block oscillator including a second electron tube having its input capacitively coupled to said first electron tube, means including circuit connections from said second electron tube to said first electron tube for modifying the voltage curve in the output of said first electron tube, the time constant of the input circuit of said second electron tube being longer than the period of the wave shape impressed on said first tube by said oscillator.

10. An electronic circuit comprising a source of signal energy, a first electron tube having its input connected to said source of signal energy, an output circuit including a load connected to said electron tube, a block oscillator including a second electron tube having its input capacitively coupled to said first electron tube, means including circuit connections from said second electron tube to said first electron tube for modifying the voltage curve in the output of said first electron tube, the time constant of the input circuit of said second electron tube being longer than the period of the wave shape impressed in said first tube by said source of signal energy.

11. In an electronic circuit for generating sweep signals, a first vacuum tube having a control grid connectible to be fed by a sweep oscillator generating a signal of a predetermined shape, an anode for said tube, a blocking oscillator including a second tube having an anode and a control electrode, a transformer having a primary winding connected to said anode of said first tube and having a secondary winding connected to the anode of said second tube, circuit connections from the anode of said first tube to said control electrode of said second tube including a coupling capacitor, a deflection coil, and circuit connections for feeding energy from said transformer to said deflecting coil.

12. In an electronic circuit for generating sweep signals, a first vacuum tube having a control grid connectible to be fed by a sweep oscillator generating a signal of a predetermined shape, an anode for said tube, a blocking oscillator including a second tube having an anode and a control electrode, a transformer having a primary winding connected to said anode of said first tube and having a secondary winding connected to the anode of said second tube, circuit connections from the anode of said first tube to said control electrode of said second tube including a coupling capacitor and resistance, the time constant of said capacitor and resistance being larger than the period of said sweep signal, the output of said second tube accumulatively increasing the voltage induced across said transformer by said first tube, a deflection coil, and circuit connections for feeding energy from said transformer to said deflecting coil.

13. In an electronic circuit for generating sweep signals, a first vacuum tube having a control grid connectible to be fed by a sweep oscillator generating a signal of a predetermined shape, an anode for said tube, a blocking oscillator including a second tube having an anode and a control electrode, a transformer having a primary winding connected to said anode of said first tube and having a secondary winding connected to the anode of said second tube, circuit connections from the anode of said first tube to said control electrode of said second tube including a coupling capacitor, a deflection coil, and circuit connections for feeding energy from said transformer to said deflecting coil, the coupling of said secondary to the primary of said transformer being in a direction to accumulatively increase the voltage induced across said transformer by said first tube.

14. In an electronic circuit for generating sweep signals, a first vacuum tube having a control grid connectible to be fed by a sweep oscillator generating a signal of a predetermined shape, an anode for said tube, a blocking oscillator including a second tube having an anode and a control electrode, a transformer having a primary winding connected to said anode of said first tube and having a secondary winding connected to the anode of said second tube, circuit connections from the anode of said first tube to said control electrode of said second tube including a coupling capacitor and resistance, the time constant of said capacitor and resistance being larger than the period of said sweep signal, the output of said second tube accumulatively increasing the voltage induced across said transformer by said first tube, a deflection coil, and circuit connections for feeding energy from said transformer to said deflecting coil, the coupling of said secondary to the primary of said transformer being in a direction to accumulatively increase the voltage induced across said transformer by said first tube.

15. In an electronic circuit for generating sweep signals, a first tube having an input connectible to be energized by a sweep oscillator generating a sweep and retrace signal of a predetermined shape, circuit connections in the output circuit of said tube for generating a sweep and retrace signal of a shape in accordance with the shape of said first signal, a second tube, circuit connections from the output of said first tube to the input of said second tube for energizing said second tube only during the retrace time of the output signal of said first tube and circuit connections from the output of said second tube to the input of said second tube for accumulatively effecting the energization of said second tube in response to its energization during the retrace time.

16. In an electronic circuit for generating sweep signals, a first tube having an input connectible to be energized by a sweep oscillator generating a sweep and retrace signal of a predetermined shape, circuit connections in the output circuit of said tube for generating a sweep and retrace signal of a shape in accordance with the shape of said first signal, a second tube, a capacitive coupling circuit connection from the output of said first tube to the input of said second tube for energizing said second tube only during the retrace time of the output signal of said first tube and circuit connections from the output of said second tube to the input of said second tube for accumulatively effecting the energization of said second tube in response to its energization during the retrace time.

17. In an electronic circuit for generating sweep signals, a first tube having an input connectible to be energized by a sweep oscillator generating a sweep and retrace signal of a predetermined shape, circuit connections in the output circuit of said tube for generating a sweep and retrace signal of a shape in accordance with the shape of said first signal, a blocking oscillator including a second tube, circuit connections from the output of said first tube to the input of said second tube for energizing said second tube only during the retrace time of the output signal of said first tube, said circuit connections including a coupling condenser and a resistance having a time constant greater than the period of the sweep signals, and circuit connections from the output of said second tube to the input of said second tube for accumulatively effecting the energization of said second tube in response to its energization during the retrace time.

18. In an electronic circuit for generating sweep signals, a first tube having an input connectible to be energized by a sweep oscillator generating a sweep and retrace signal of a predetermined shape, circuit connections in the output circuit of said tube for generating a sweep and retrace signal of a shape in accordance with the shape of said first signal, a transformer having a primary and a secondary, a second tube, circuit connections from the output of said first tube to said transformer and to the input of said second tube for energizing said second tube only during the retrace time of the output signal of said first tube, and circuit connections from the output of said second tube through the secondary of said transformer to the input of said second tube for accumulatively increasing the voltage of said transformer in response to its energization during the retrace time.

19. In an electronic circuit for generating sweep signals, a first vacuum tube having a control electrode connectible to a sweep oscillator generating a sweep and retrace signal of a predetermined shape, an anode for said tube, a transformer having a primary and secondary winding, circuit connections from said primary to said anode of said tube for inducing a predetermined voltage across said primary, and circuit connections including a blocking oscillator for increasing the voltage across said primary during the retrace time of said signal comprising a second tube having an anode and control electrode, direct circuit connections from the anode of said second tube to the secondary of said transformer and circuit connections including a coupling capacitor from the anode of said first tube to the control electrode of said second tube.

20. In an electronic circuit for generating sweep signals, a first vacuum tube having a control electrode connectible to a sweep oscillator generating a sweep and retrace signal of a predetermined shape, an anode for said tube, a transformer having a primary and secondary winding, circuit connections from said primary to said anode of said tube for inducing a predetermined voltage across said primary, and circuit connections including a blocking oscillator for increasing the voltage across said primary during the retrace time of said signal comprising a second tube having an anode and control electrode, direct circuit connections from the anode of said second tube to the secondary of said transformer and circuit connections including a coupling capacitor and resistor from the anode of said first tube to the control electrode of said second tube, said capacitor and resistor having a time constant greater than the period of the sweep signal.

21. In an electronic circuit for generating sweep signals, a first vacuum tube having a control electrode connectible to a sweep oscillator generating a sweep and retrace signal of a predetermined shape, an anode for said tube, a transformer having a primary and secondary winding, circuit connections from said primary to said anode of said tube for inducing a predetermined voltage across said primary, and a block oscillator for increasing the voltage across said primary during the retrace time of said signal comprising a second tube having an anode and control electrode, direct circuit connections from the anode of said second tube to the secondary of said transformer and circuit connections including a coupling capacitor from the anode of said first tube to the control electrode of said second tube.

22. In an electronic circuit for generating sweep signals, a first vacuum tube having a control electrode connectible to a sweep oscillator generating a sweep and retrace signal of a predetermined shape, an anode for said tube, a transformer having a primary and secondary winding, circuit connections from said primary to said anode of said tube for inducing a predetermined voltage across said primary, and circuit connections including a blocking oscillator for increasing the voltage across said primary during the retrace time of said signal comprising a second tube having an anode and control electrode, direct circuit connections from the anode of said second tube to the secondary of said transformer and circuit connections including a coupling capacitor and resistor from the anode of said first tube to the control electrode of said second tube, said capacitor and resistor having a time constant greater than the period of the sweep signal.

RICHARD G. CLAPP.

REFERENCES CITED

The following references are of record in the file of this patent:

UNITED STATES PATENTS

| Number | Name | Date |
|---|---|---|
| 2,215,177 | Hepp | Sept. 17, 1940 |
| 2,230,819 | White | Feb. 4, 1941 |
| 2,237,425 | Geiger | Apr. 8, 1941 |
| 2,248,975 | Faudell | July 15, 1941 |
| 2,280,990 | White | Apr. 28, 1942 |
| 2,302,161 | Woerner | Nov. 17, 1942 |
| 2,382,822 | Schade | Aug. 14, 1945 |
| 2,416,188 | McClellan | Feb. 18, 1947 |